United States Patent [19]

Tanaka et al.

[11] Patent Number: 5,132,047
[45] Date of Patent: Jul. 21, 1992

[54] ORGANOPOLYSILOXANE EMULSION COMPOSITION

[75] Inventors: Masaki Tanaka; Teiichi Mutoh; Noriyuki Meguriya; Eiichi Tabei, al of Annaka, Japan

[73] Assignee: Shin-Etsu Chemical Co., Ltd., Tokyo, Japan

[21] Appl. No.: 650,994

[22] Filed: Feb. 4, 1991

Related U.S. Application Data

[63] Continuation of Ser. No. 307,636, Feb. 8, 1989, abandoned.

[30] Foreign Application Priority Data

Feb. 9, 1988 [JP] Japan .................. 63-29797

[51] Int. Cl.$^5$ .............. B01J 13/00; B01F 17/54; C07F 7/08
[52] U.S. Cl. .................. 252/308; 252/312; 252/351; 106/287.14
[58] Field of Search .......... 252/308, 312, 351; 106/287.14, 287.13

[56] References Cited

U.S. PATENT DOCUMENTS

| 3,341,338 | 9/1967 | Pater | 106/287.14 X |
| 3,359,212 | 12/1967 | Bailey | 252/312 |
| 3,600,418 | 8/1971 | Bailey et al. | 252/351 X |
| 3,962,119 | 6/1976 | Cosentino et al. | 252/312 X |
| 4,010,110 | 3/1977 | Cosentino et al. | 252/312 X |
| 4,122,029 | 10/1978 | Gee et al. | 252/308 X |
| 5,036,123 | 7/1991 | Ozaki et al. | 106/287.14 X |

FOREIGN PATENT DOCUMENTS 61-212321 9/1986 Japan.
61-212324 9/1986 Japan.

OTHER PUBLICATIONS

Kanner et al., *Synthesis and Properties of Siloxane-Polyether Copolymer Surfactants*, I&EC Product Res. and Development, 6, 88, 1967.

Rosen, *Surfactants and Interfacial Phenomena* (John Wiley & Sons, NY), 1983, pp. 100–102.

*Primary Examiner*—Robert L. Stoll
*Assistant Examiner*—Daniel S. Metzmaier
*Attorney, Agent, or Firm*—Oblon, Spivak, McClelland, Maier & Neustadt

[57] ABSTRACT

An organopolysiloxane emulsion composition comprising:
a silicone emulsifying agent comprising a compound represented by the general formula (I):

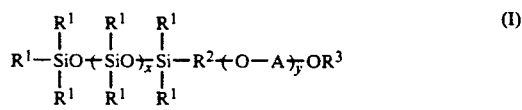

wherein a plurality of $R^1$ may be the same or different and each represent a substituted or unsubstituted monovalent hydrocarbon group having 1 to 20 carbon atoms; $R^2$ represents a divalent hydrocarbon group having 1 to 6 carbon atoms; $R^3$ represents an atom or group selected from the group consisting of a hydrogen atom, an acetyl group, $R^1$, and $-Si(R^1)_3$; A represents a divalent hydrocarbon group having 1 to 4 carbon atoms; and x and y are numbers of $5 \leq x \leq 50$ and $1 \leq y \leq 100$, respectively;
an organopolysiloxane which is liquid at room temperature; and
water.

This emulsion composition can be prepared as either w/o emulsion or o/w emulsion with good stability.

5 Claims, No Drawings

ORGANOPOLYSILOXANE EMULSION COMPOSITION

This application is a continuation of application Ser. No. 07/307,636, filed on Feb. 8, 1989, now abandoned.

BACKGROUND OF THE INVENTION

1. Field of the Invention

This invention relates to an organopolysiloxane emulsion composition.

2. Description of the Prior Art

To obtain oil-in-water (o/w) or water-in-oil (w/o) emulsions by chiefly using various organopolysiloxanes as typified by dimethylpolysiloxane, various surface active agents of nonionic, anionic, cationic or amphoteric type having a higher hydrocarbon group as a hydrophobic group are used as emulsifying agents like the case when usual organic liquids, wax, polyethylene, etc. are emulsified.

In selecting a surface active agent from these, it is well known that the component to be emulsified must have an affinity for the hydrophobic group moiety of the surface active agent. However, it is also known to be true that commonly available organopolysiloxanes have a poor affinity for the hydrophobic group moiety of these surface active agents.

Accordingly, it is readily conjectured that employment of a surface active agent which has an organopolysiloxane moiety as the hydrophobic group would be effective for emulsifying the organopolysiloxanes. For example, Japanese Unexamined Patent Publications (KOKAI) No. 212321/1986 and No. 212324/1986 disclose that a block copolymer comprised of a polyoxyalkylene group attached to a side chain or to both ends or to both the side chain and the ends of the organopolysiloxane molecular chain can be used as an emulsifying agent for emulsifying relatively low molecular organopolysiloxanes. These silicone surface active agents, however, can emulsify the relatively low molecular organopolysiloxanes, but may give insufficient performance to emulsify organopolysiloxanes having a higher polymerization degree, and thus have been unable to obtain either w/o emulsions or o/w emulsions having a good stability.

In KAGAKU KOGYO ZASSHI (Journal of Chemical Industry), Vol. 73, No. 6, and HYOMEN (Surface), Vol. 7, No. 11, Maki and Komori report an organopolysiloxane surface active agent which is an AB type block copolymer composed of a relatively low molecular dimethylpolysiloxane and a polyoxyalkylene. The performance of this organopolysiloxane to emulsify organopolysiloxanes.

In general, however, in silicone emulsifying agents obtained by conventional techniques, AB-block copolymers are mixtures consisting of a polymer containing functional groups at both ends, a polymer terminated with triorganosiloxy groups at both ends and a polymer having a functional group only at one end, except the case when a diorganopolysiloxane moiety of the copolymer is prepared from a starting low molecular substance feasible for distillation, separation and purification. Therefore, the AB-block copolymers can not exhibit any good surface activity.

SUMMARY OF THE INVENTION

Accordingly, an object of this invention is to provide a stable and uniform organopolysiloxane emulsion composition.

As such a composition, this invention provides an organopolysiloxane emulsion composition comprising:

a silicone emulsifying agent comprising a compound represented by the general formula (I):

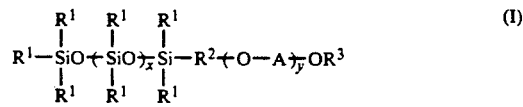

wherein a plurality of $R^1$ may be the same or different and each represent a substituted or unsubstituted monovalent hydrocarbon group having 1 to 20 carbon atoms; $R^2$ represents a divalent hydrocarbon group having 1 to 6 carbon atoms; $R^3$ represents an atom or group selected from the group consisting of a hydrogen atom, an acetyl group, $R^1$, and $-Si(R^1)_3$, where $R^1$ is as defined above; A represents a divalent hydrocarbon group having 1 to 4 carbon atoms; and x and y are numbers of $5 \leq x \leq 50$ and $1 \leq y \leq 100$, respectively;

an organopolysiloxane which is liquid at room temperature; and water.

The organopolysiloxane emulsion composition of this invention comprises dispersed particles of fine and uniform size and has a good stability. It can obtain with great ease a w/o emulsion by making large, or an O/W emulsion by making small, the ratio of hydrophobic group moiety/hydrophilic group moiety in the molecule of the compound of the general formula (I).

Like the commonly available organic hydrocarbon emulsifying agents, an emulsion with a higher stability can be obtained by using in combination the emulsifying agents having differences in the above ratio.

The present emulsion can give a film to be formed by drying, which film is highly uniform and therefore highly transparent as compared with films to be obtained from emulsion compositions in which conventional organic hydrocarbon emulsifying agents are used.

DETAILED DESCRIPTION OF PREFERRED EMBODIMENTS OF THE INVENTION

In the general formula (I) that represents the compound used in this invention as the emulsifying agent, the substituted or unsubstituted monovalent $C_1$ to $C_{20}$ hydrocarbon group represented by $R^1$ includes, for example, alkyl groups such as methyl, ethyl, propyl, butyl, pentyl, hexyl, octyl and dodecyl; aryl groups such as phenyl, tolyl and naphthyl; as well as hydrocarbon groups substituted with a halogen atom such as fluorine, chlorine or bromine. In particular, it is preferred that 80% or more of $R^1$ is comprised of methyl groups. The divalent $C_1$ to $C_6$ hydrocarbon group represented by $R^2$ includes alkylene groups such as a methylene group, an ethylene group, a trimethylene group, a tetramethylene group, a pentamethylene group and a hexamethylene group, and phenylene groups. $R^3$ represents a hydrogen atom, an acetyl group, the same monovalent hydrocarbon group as the above $R^1$, or a substituted silyl group $-Si(R^1)_3$ (where $R^1$ is as defined above) as exemplified by $-Si(CH_3)_3$, $-Si(CH_3)_2C_2H_5$, —SiCH$_3$(C$_6$H$_5$)$_2$ and —Si(C$_6$H$_5$)$_3$. The divalent C$_1$ to C$_4$ hydrocarbon group represented by A includes, for example, alkylene groups such as a methylene group, an ethylene group, a trimethylene group and a tetramethylene group.

Examples of such a compound represented by the general formula (I) are:

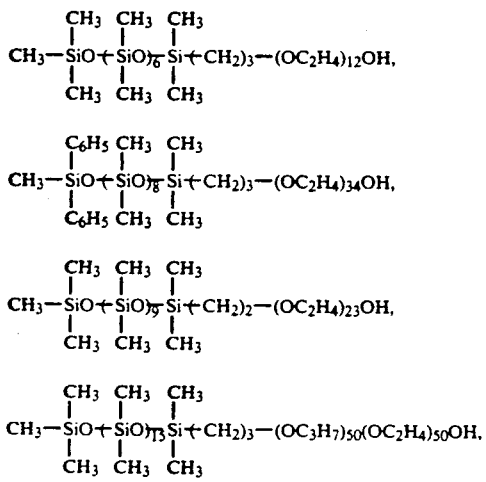

and

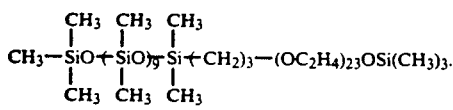

The above compound is suited as the emulsifying agent for emulsifying organopolysiloxanes, and can give uniform and stable organopolysiloxane emulsion composition of this invention. In particular, in the general formula (I), the compound in which a hydrophilic group moiety represented by the general formula (II):

$$—(O—A—)_Y—OR^3 \tag{II}$$

wherein A, Y and R$^3$ are as defined above, is held in a proportion of from 15 to 33% by weight in the molecule of the compound of the general formula (I) is suited for the formation of w/o emulsions because of its lower HLB and higher affinity for organopolysiloxanes, and the compound in which the above moiety is held in a proportion of from 35 to 55% by weight is suited for the formation of O/W emulsions because of its high hydrophilic nature. Accordingly, compounds having the hydrophilic group moiety in an appropriate proportion in the molecule are selected depending on whether the desired emulsion composition is of w/o type or O/W type.

The compound of the general formula (I) can be prepared, for example, by subjecting an organopolysiloxane having an Si—H bond at one end, represented by the general formula (III):

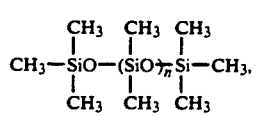

wherein R$^1$ and x are as defined above, and a polyoxyethylene compound having a vinyl group at one end, represented by the general formula (IV):

$$CH_2=CHCH_2—(O—A—)_Y—OH \tag{IV}$$

wherein A and Y are as defined above to addition reaction in the presence of a platinum group catalyst.

The compound of the general formula (III) used in this process can be obtained by reacting a hexaorganocyclotrisiloxane with a triorganosilanol in the presence of a pentacoordinate silicon compound catalyst as exemplified by a compound represented by the formula:

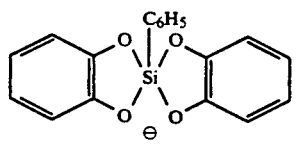

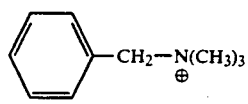

to obtain an organopolysiloxane terminated with a silanol group at one end, represented by the formula:

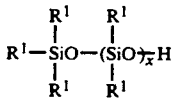

wherein R$^1$ and x are as defined above, and next subjecting the organopolysiloxane and a diorganochlorosilane [H(R$^1$)$_2$SiCl, where R$^1$ is as defined above] to dehydrochlorination reaction in the presence of, for example, trimethylamine as a dehydrochlorinating agent.

The organopolysiloxane used as the second component in the emulsion composition of this invention includes, for example, organopolysiloxanes which is represented by the general unit formula (V):

$$R^4{}_a R^5{}_b SiO_{\frac{4-a-b}{2}} \tag{V}$$

wherein R$^4$ represents a monovalent hydrocarbon group having a functional group selected from the group consisting of a hydroxyl group, an amino group, an epoxy group, a carboxyl group, a mercapto group, a vinyl group and an allyl group; R$^5$ represents a monovalent hydrocarbon group having 1 to 20 carbon atoms, which may be substituted with a halogen atom; and a and b are numbers in the range of $0 \leq a \leq 1$ and $1 \leq b \leq 3$, respectively, satisfying $1.8 \leq a+b \leq 2.2$, and is liquid at room temperature.

Examples of such an organopolysiloxane are those represented respectively by the formulas:

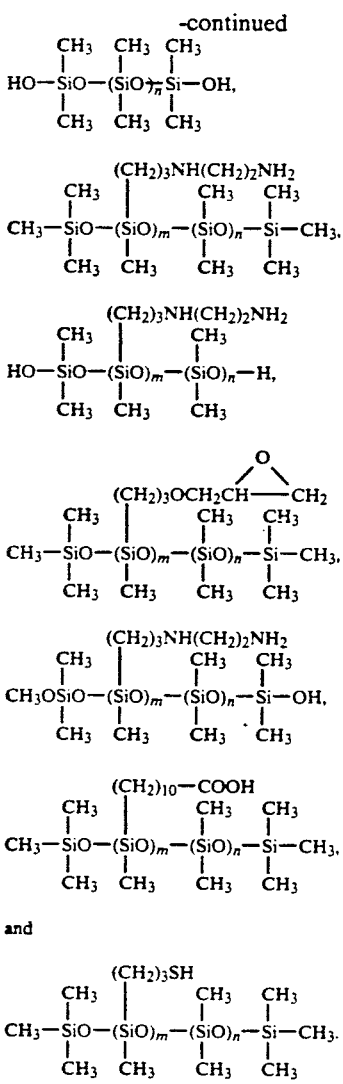

and

[In the above formulas, m and n are an integer such that the respective organopolysiloxanes are liquid at room temperature.]

Components (A), (B) and (C) in the organopolysiloxane emulsion composition of this invention are usually so proportioned that the above silicone emulsifying agent (A) may be in the range of from 1 to 100 parts by weight, and water (C) from 30 to 1,000 parts by weight, based on 100 parts by weight of the organopolysiloxane (B).

The emulsion composition can be prepared by emulsifying a mixture comprising the desired components with use of a high-speed stirrer such as a homomixer, or a colloid mill, according to a conventional method, and by further using a homogenizer particularly when more finely dispersed particles are obtained.

In the emulsion composition of this invention, a filler such as silica and almina, a pigment, a perfume, an antiseptic agent, an antioxidant and other surface active agents, for example, can be optionally added according to a conventional method.

The emulsion composition of this invention, particularly the O/W composition, is useful as a softener, a hydrophilizing agent, a surface-protecting agent, a lustering agent, etc. when used as a surface treatment agent for various materials as exemplified by natural-or-synthetic-textiles or fabrics and synthetic-resin articles, and also useful for cosmetics.

EXAMPLES

This invention will now be described in detail with reference to Examples.

Synthesis Example 1

In a 1 liter four-necked flask made of glass and equipped with a dropping pipe, a reflux device, a thermometer and a stirrer made of glass, 666 g of hexamethylcyclotrisiloxane, 90 g of trimethylsilanol and 0.1 g of a compound represented by the above formula:

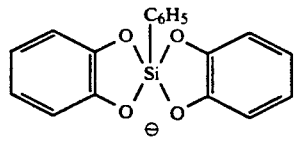

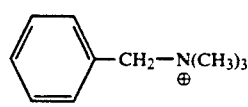

as a catalyst were charged, and reacted with stirring at 80° C. for 16 hours to form a dimethylpolysiloxane terminated with a silanol group at one end, represented by the formula:

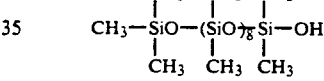

Next, 60 g of triethylamine was added in the resulting reaction mixture, to which 94.5 g of dimethylmonochlorosilane was dropwise added with stirring at room temperature, and thereafter stirring was continued for 5 hours. The resulting reaction mixture was washed with water to obtain a liquid polysiloxane represented by the formula:

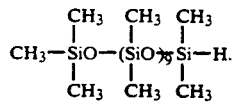

Next, in a 1 liter four-necked flask similar to the above, 81.4 g of the liquid polysiloxane obtained in the above, 155.4 g of polyoxyethylene compound represented by the formula: CH$_2$=CHCH$_2$—(OC$_2$H$_4$)$_{34}$—OH, 100 g of toluene and 0.1 g of a 2% chloroplatinate (H$_2$PtCl$_6$.6H$_2$O) solution in isopropanol were charged, followed by heating with stirring at 100° C. for 5 hours. After confirmation of the disappearance of the absorption at the Si—H bond (2,150 cm$^{-1}$) in the IR spectrum of the reaction mixture, the solvent was removed from the reaction mixture under reduced pressure to obtain a water-soluble compound represented by the following formula, which is solid at room temperature and has a melting point of 47° to 48° C. and has a 1% cloud point of 82° to 85° C.

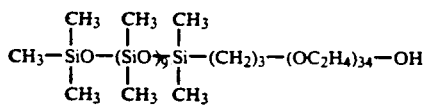

This compound was found to be a surface active agent that shows in an aqueous solution thereof a critical micelle concentration of $2.2 \times 10^{-3}$ mol/liter and a surface tension of about 37 dyne/liter. (This compound is hereinafter called Emulsifying Agent A.)

Synthesis Example 2

Synthesis Example 1 was repeated but using a compound represented by the formula:

$$CH_2=CHCH_2-(OC_2H_4)_{11}-OH$$

as the polyoxyethylene compound, to obtain an emulsifying agent represented by the formula:

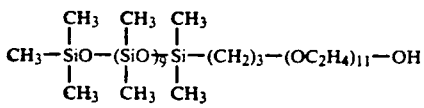

(hereinafter called Emulsifying Agent B).

Comparative Synthesis Example 1

Sixty-seven g of 1,1,3,3-tetramethyldisiloxane [H(CH$_3$)$_2$SiOSi(CH$_3$)$_2$H], 81 g of hexamethyldisiloxane and 666 g of octamethylcyclotetra-siloxane were reacted in the presence of 24 g of concentrated sulfuric acid, with stirring at room temperature for 8 hours. Thereafter the concentrated sulfuric acid was removed by washing with water and stripping of low boiling matters were carried out to obtain a dimethylpolysiloxane having an Si—H bond. Added to this in the same manner as in Synthesis Example 1 was a polyoxyethylene compound terminated with a vinyl group at one end, represented by the formula:

$$CH_2=CHCH_2-(OC_2H_4)_{11}-OH$$

to obtain a compound represented on the average by the formula:

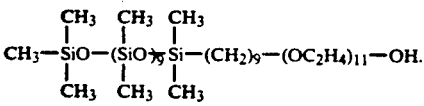

This compound is presumed to comprise a 1:2:1 (in molar ratio) mixture of three compounds represented respectively by the formulas:

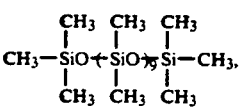

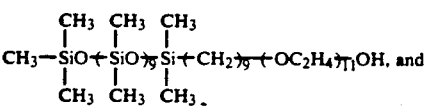

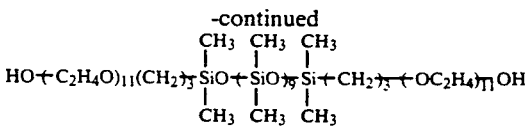

(hereinafter called Comparative Emulsifying Agent I).

Comparative Synthesis Example 2

Comparative Synthesis Example 1 was repeated but using tetramethyldisiloxane and octamethylcyclotetrasiloxane as starting materials and not using hexamethyldisiloxane, to obtain a siloxane represented on the average by the formula:

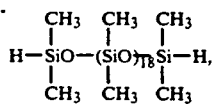

to which a polyoxyethylene compound represented by the formula: $CH_2=CHCH_2-(OC_2H_4)_4-OH$ was added to obtain an emulsifying agent represented by the formula:

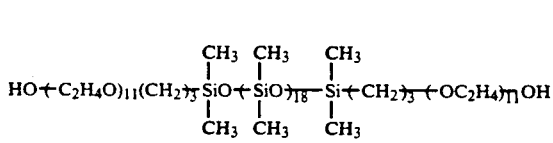

(hereinafter called Comparative Emulsifying Agent II).

Comparative Synthesis Example 3

Comparative Synthesis Example 1 was repeated but using hexamethyldisiloxane, pentamethylcyclotetrasiloxane and cyclotetrasiloxane of the formula:

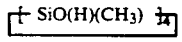

as starting materials to obtain an methylhydrogensiloxane represented by the formula:

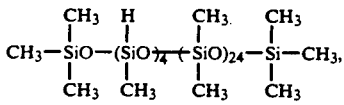

to which the polyoxyethylene compound used in Comparative Synthesis Example 1 was added in the same manner as Synthesis Example 1 to obtain an emulsifying agent represented by the formula:

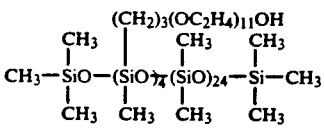

(hereinafter called Comparative Emulsifying Agent III).

EXAMPLE 1

Preparation of Emulsion

With 3 parts by weight of Emulsifying Agent B obtained in the above, or 3 parts by weight of any one of Comparative Emulsifying Agents I to III and 67 parts by weight of water, it was attempted to emulsify 30 parts by weight of dimethylpolysiloxane of 50 cSt at 25° C. by means of a homomixer. Emulsifiability was evaluated according to the following criterions.

A: No seperation is observed 20 hours after an emulsion has been left at room temperature.

B: Seperation is observed 20 hours after an emulsion has been left at room temperature.

Average particle diameter of dispersed particles was also measured in regard to the resulting emulsion. Results obtained are shown in Table 1.

TABLE 1

| Emulsifying agent | Proportion of hydrophilic group moiety (wt. %) | Emulsifi- ability | Particle diameter (micron) |
|---|---|---|---|
| Emulsifying Agent B Comparative | 38 | A | 0.1 |
| Emulsifying Agent I | 40 | B | — |
| Emulsifying Agent II | 40 | B | — |
| Emulsifying Agent III | 47.5 | B | — |

Only Emulsifying Agent B resulted in formation of a good O/W emulsion.

EXAMPLE 2

(1) The procedure similar to that of Synthesis Example 1 was followed to obtain an emulsifying agent represented by the formula:

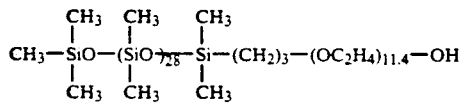

(hereinafter called Emulsifying Agent C). This emulsifying agent was found to hold the hydrophilic group moiety in its molecule in the proportion of 18% by weight, and to be a colorless transparent liquid having a viscosity of 28 cSt at 25° C. and a refractive index of 1.4156, capable of being dissolved in dimethylpolysiloxane.

(2) Using a homomixer, 6.0 parts by weight of Emulsifying Agent C, 30 parts by weight of dimethylpolysiloxane terminated with trimethylsilyl groups at both ends, having a viscosity of 20 cSt, and 64 parts by weight of city water were emulsified to obtain a w/o emulsion.

This emulsion was milk-white in appearance, had a viscosity of 2,500 cP/25° C., and was readily dispersed in a liquid dimethylpolysiloxane. Also, this emulsion showed no change in appearance even after it was left for 1 month, exhibiting a high stability.

EXAMPLE 3

(1) The procedure similar to that of Synthesis Examples 1 was followed to prepare three kinds of emulsifying agents represented respectively by the following formulas:

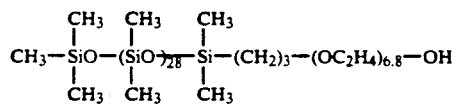

(hereinafter called Emulsifying Agent D)

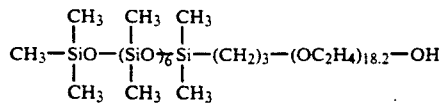

(hereinafter called Emulsifying Agent E)

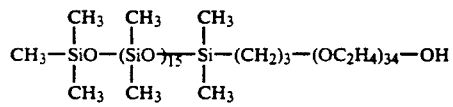

(hereinafter called Emulsifying Agent F) These emulsifying agents held the hydrophilic group moiety in the proportion as shown in Table 2.

(2) With each of Emulsifying Agents D to F, an amine-modified dimethylpolysiloxane represented by the formula:

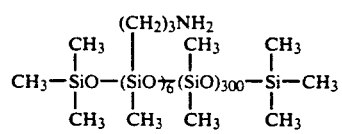

having a viscosity of 1,100 cSt/25° C. and an amine equivalent weight of 3,850 was emulsified under four kinds of formulation as shown in Table 2 by means of a homomixer. The emulsifiability and average particle diameter of dispersed particles in the resulting emulsions were evaluated in the same manner as Example 1, and the stability when the emulsions were diluted was also evaluated according to the following method.

Evaluation of Stability When Diluted

An aqueous solution consisting of 2% of an emulsion and 98% of water is made up and the state of its surface is observed after it has been left for 20 hours. The solution which shows neither oil film nor suspended matters on its surface is evaluated as "good".

TABLE 2

| Components | Proportion of hydrophilic group moiety (wt. %) | Test No. | | | |
|---|---|---|---|---|---|
| | | 5-1 | 5-2 | 5-3 | 5-4[2] |
| Amino-modified oil: | | 30 | 30 | 30 | 30 |
| Emulsifying Agent D: | 12 | 3 | — | — | 1.5 |
| Emulsifying Agent E: | 57.5 | — | 3 | — | 1.5 |
| Emulsifying Agent F: | 54.5 | — | — | 3 | — |
| Water: | | 67 | 67 | 67 | 67 |
| Emulsifiability: | | B[1] | B[1] | A | A |
| Particle diameter of dispersed particles: (nm) | | — | — | 650 | 350 |
| Stability when diluted: | | — | — | good | good |

Remarks:
[1]Separation was observed
[2]Average proportion of the hydrophilic group moiety: 35% by weight

What we claim is:

1. An organopolysiloxane emulsion composition comprising:
   a silicone emulsifying agent comprising a compound represented by the general formula (I):

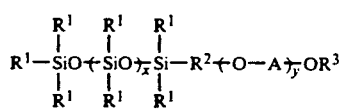

(I)

wherein a plurality of $R^1$ may be the same or different and each represent an unsubstituted or halogen substituted monovalent hydrocarbon group having 1 to 20 carbon atoms; $R^2$ represents a divalent hydrocarbon group having 1 to 6 carbon atoms; $R^3$ represents a hydrogen atom or an acetyl group; A represents a divalent hydrocarbon group having 1 to 4 carbon atoms; and x and y are numbers of $5 \leq x \leq 50$ and $1 \leq y \leq 100$, respectively;

an organopolysiloxane which is liquid at room temperature; and water.

2. The emulsion composition according to claim 1, wherein the compound of the general formula (I) is a compound represented by the formula:

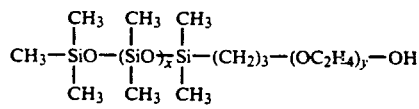

wherein x and y are as defined above.

3. The emulsion composition according to claim 1, wherein a hydrophilic group moiety represented by the formula:

wherein A, y and $R^3$ are as defined above, in the compound of the general formula (I) is held in the proportion of from 15 to 33% by weight in its molecule.

4. The emulsion composition according to claim 1, wherein a hydrophilic group moiety represented by the formula:

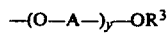

wherein A, y and $R^3$ are as defined above, in the compound of the general formula (I) is held in the proportion of from 35 to 55% by weight in its molecule.

5. The emulsion composition according to claim 1, wherein said silicone emulsifying agent is contained in the proportion of from 1 to 100 parts by weight, and said water from 30 to 1,000 parts by weight, based on 100 parts by weight of said organopolysiloxane.

* * * * *